US012811226B2

(12) United States Patent
Honda et al.

(10) Patent No.: US 12,811,226 B2
(45) Date of Patent: Nov. 24, 2026

(54) BATTERY, BATTERY SYSTEM AND BATTERY MANUFACTURING METHOD

(71) Applicant: Panasonic Intellectual Property Management Co., Ltd., Osaka (JP)

(72) Inventors: Kazuyoshi Honda, Osaka (JP); Eiichi Koga, Osaka (JP); Koichi Hirano, Osaka (JP); Akira Kawase, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 562 days.

(21) Appl. No.: 18/364,992

(22) Filed: Aug. 3, 2023

(65) Prior Publication Data

US 2023/0387525 A1 Nov. 30, 2023

Related U.S. Application Data

(63) Continuation of application No. PCT/JP2021/047660, filed on Dec. 22, 2021.

(30) Foreign Application Priority Data

Feb. 12, 2021 (JP) ................................ 2021-021304

(51) Int. Cl.

*H01M 50/186* (2021.01)
*H01M 10/0562* (2010.01)
*H01M 10/0585* (2010.01)

(52) U.S. Cl.

CPC ..... *H01M 50/186* (2021.01); *H01M 10/0562* (2013.01); *H01M 10/0585* (2013.01)

(58) Field of Classification Search

CPC ........... H01M 50/186; H01M 10/0562; H01M 10/0585; H01M 10/052; H01M 50/193; H01M 50/204; Y02E 60/10; Y02P 70/50

See application file for complete search history.

(56) References Cited

U.S. PATENT DOCUMENTS

| | | | |
|---|---|---|---|
| 6,616,714 B1 | 9/2003 | Gauthier et al. |
| 2004/0241537 A1 | 12/2004 | Okuyama et al. |

(Continued)

FOREIGN PATENT DOCUMENTS

| | | |
|---|---|---|
| CN | 111029635 A | 4/2020 |
| JP | 2000-090940 A | 3/2000 |

(Continued)

OTHER PUBLICATIONS

English Translation JP2002280059.*

(Continued)

*Primary Examiner* — Kiran Quraishi Akhtar
(74) *Attorney, Agent, or Firm* — WHDA, LLP

(57) ABSTRACT

The battery includes: a power generation element including a negative electrode active material layer, a positive electrode active material layer, and a solid electrolyte layer positioned between the negative electrode active material layer and the positive electrode active material layer; a sealing material that seals a first surface, which is a side surface of the power generation element; and a negative electrode current collector positioned on a side of the negative electrode active material layer in the power generation element. In the battery, a void surrounded by the sealing material, the first surface, and the negative electrode current collector is present, and the internal pressure of the void is lower than 1 atm. The negative electrode current collector includes a first recess curved to be recessed toward the void.

13 Claims, 11 Drawing Sheets

(56) References Cited

U.S. PATENT DOCUMENTS

| | | | |
|---|---|---|---|
| 2020/0119363 | A1 | 4/2020 | Honda et al. |
| 2020/0280035 | A1 | 9/2020 | Park et al. |
| 2021/0288348 | A1 | 9/2021 | Honda et al. |

FOREIGN PATENT DOCUMENTS

| | | | | |
|---|---|---|---|---|
| JP | 2002-280059 | A | 9/2002 | |
| JP | 2002280059 | * | 9/2002 | ............. Y02E 60/10 |
| JP | 2004-319464 | A | 11/2004 | |
| JP | 2019-033043 | A | 2/2019 | |
| JP | 2019-096412 | A | 6/2019 | |
| JP | 2020-035664 | A | 3/2020 | |
| JP | 2020-533773 | A | 11/2020 | |
| WO | 2020/136971 | A1 | 7/2020 | |

OTHER PUBLICATIONS

Extended European Search Report dated Dec. 20, 2024 issued in the corresponding European Patent Application No. 21925856.3.

International Search Report issued on Mar. 1, 2022 in International Patent Application No. PCT/JP2021/047660, with English translation.

Office Action dated Aug. 12, 2026, issued in counterpart CN Application No. 202180093333.1, with partial English translation. (10 pages).

* cited by examiner

BATTERY, BATTERY SYSTEM AND BATTERY MANUFACTURING METHOD

CROSS REFERENCE TO RELATED APPLICATIONS

This is a continuation application of PCT International Application No. PCT/JP2021/047660 filed on Dec. 22, 2021, designating the United States of America, which is based on and claims priority of Japanese Patent Application No. 2021-021304 filed on Feb. 12, 2021. The entire disclosures of the above-identified applications, including the specifications, drawings and claims are incorporated herein by reference in their entirety.

FIELD

The present disclosure relates to a battery, a battery system, and a battery manufacturing method.

BACKGROUND

Patent Literature (PTL) 1 discloses an air battery in which air is taken in by a stacked film including a void-retaining member including at least one selected from the group consisting of a porous film, a non-woven fabric, and a woven fabric, and an oxygen barrier film, wherein the battery container becomes negative pressure during continuous discharge by sealing holes.

PTL 2 discloses that in the manufacturing process of a power storage module using a liquid battery, the internal spaces are divided into odd-numbered internal spaces and even-numbered internal spaces, which are inspected by changing the internal pressure at one time, respectively.

CITATION LIST

Patent Literature

PTL 1: Japanese Unexamined Patent Application Publication No. 2004-319464
PTL 2: Japanese Unexamined Patent Application Publication No. 2020-35664

SUMMARY

Technical Problem

In the conventional technology, further improvements in battery characteristics and reliability are desired.

In addition, batteries containing solid electrolytes are also required to exhibit high capacity, high battery characteristics such as excellent charge-discharge cycle characteristics, and high reliability in various usage environments.

In order to develop the characteristics of a battery containing a solid electrolyte, it is important to increase the conductivity of ions and electrons, and in order to maintain this, it is important to apply an external restraining force from the normal direction of the main surface of the battery.

On the other hand, applying a mechanism for applying an external restraining force was inconvenient for obtaining the capacity density per volume and the capacity density per weight of the battery.

Therefore, the present disclosure provides a battery and the like that achieves both high battery characteristics and high reliability.

Solution to Problem

A battery according to one aspect of the present disclosure includes a power generation element including an electrode layer, a counter electrode layer, and a solid electrolyte layer positioned between the electrode layer and the counter electrode layer; a sealing material that seals a first surface which is a side surface of the power generation element; and an electrode current collector positioned on a side of the electrode layer in the power generation element; wherein a void surrounded by the sealing material, the first surface, and the electrode current collector is present, an internal pressure of the void is lower than 1 atm, and the electrode current collector includes a first recess curved to be recessed toward the void.

In addition, a battery system according to one aspect of the present disclosure includes a container including an internal space that serves as a reduced-pressure environment; and the battery described above disposed in the internal space.

In addition, a method for manufacturing a battery according to one aspect of the present disclosure is a method for manufacturing a battery including a power generation element including an electrode layer, a counter electrode layer, and a solid electrolyte layer positioned between the electrode layer and the counter electrode layer, the method including: exposing a first surface to a reduced-pressure atmosphere, the first surface being a side surface of the power generation element in a stacked body including the power generation element; and sealing the first surface with a sealing material under the reduced-pressure atmosphere.

Advantageous Effects

According to the present disclosure, it is possible to achieve both high battery characteristics and high reliability of batteries and the like.

Figure 1:
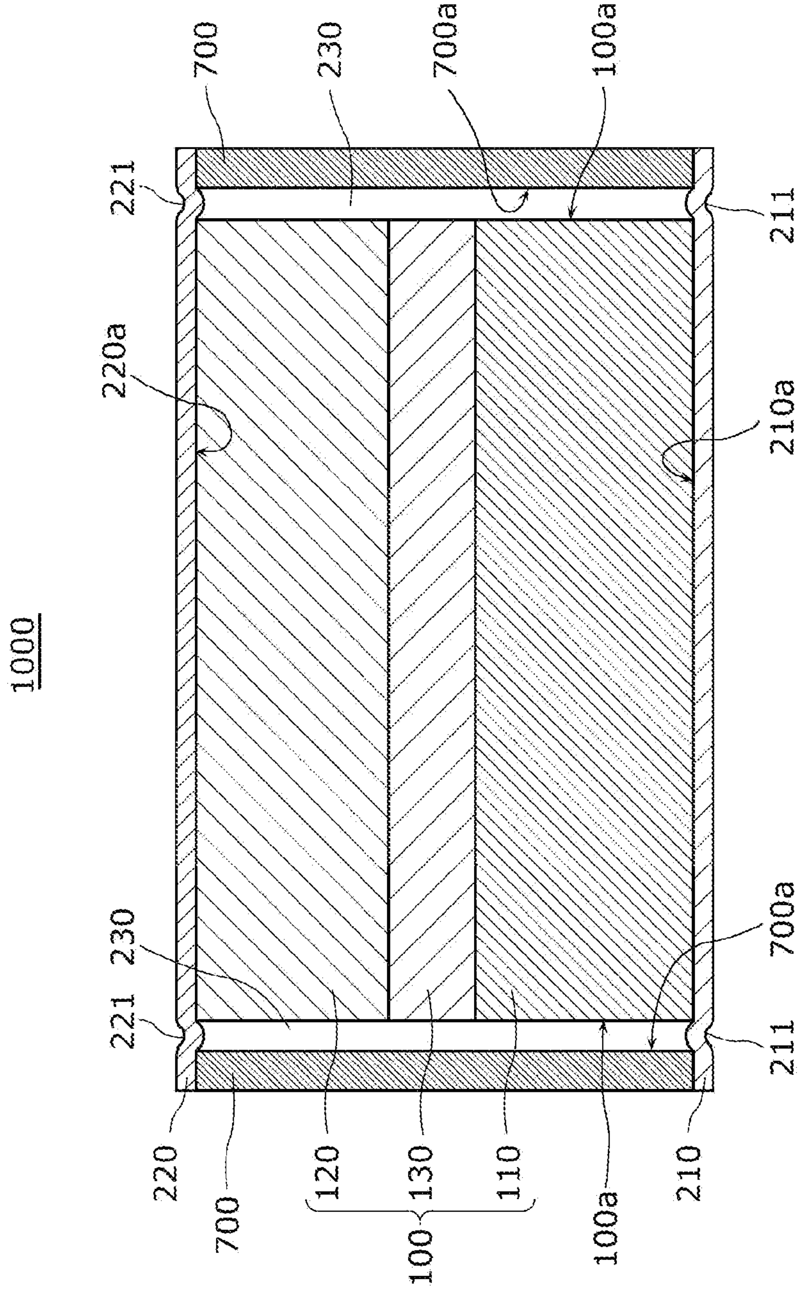
FIG. 1 is a cross-sectional view showing a schematic configuration of a battery according to Embodiment 1.

DESCRIPTION OF EMBODIMENTS (Summary of the Present Disclosure)

A battery according to one aspect of the present disclosure includes a power generation element including an electrode layer, a counter electrode layer, and a solid electrolyte layer positioned between the electrode layer and the counter electrode layer; a sealing material that seals a first surface which is a side surface of the power generation element; and an electrode current collector positioned on a side of the electrode layer in the power generation element; wherein a void surrounded by the sealing material, the first surface, and the electrode current collector is present, an internal pressure of the void is lower than 1 atm, and the electrode current collector includes a first recess curved to be recessed toward the void.

Accordingly, the battery according to the present aspect can achieve both high battery characteristics and high reliability. The power generation element can be reinforced by sealing the first surface with the sealing material. The first surface is one of the places where the mechanical strength can be the weakest in power generation element 100. On the other hand, if a void surrounded by the first surface, the sealing material, and the electrode current collector is present, when the temperature of the battery becomes high, the gas in the void will try to thermally expand, and the internal pressure of the void will become higher than the atmospheric pressure, so that a delamination force is generated between and within the layers of the power generation element. Gas expansion in the void occurs not only in the case of heating, but also when the battery is placed in a reduced-pressure environment such as high altitude or outer space. In the battery according to the present aspect, since the void has a negative pressure lower than 1 atm, even in a high-temperature environment or a reduced-pressure environment, a delamination force to the power generation element due to expansion of the void are less likely to occur. In addition, since the void with a negative pressure is also surrounded by the electrode current collector, a force acts to attract the electrode current collector to the power generation element side, forming a first recess in the electrode current collector, and a force in a direction of restraining each layer of the power generation element acts on the power generation element. As a result, the resistance between and within layers of the power generation element can be reduced, and even if the electrode layer and the counter electrode layer expand and contract due to repeated charge-discharge cycles, delamination or the like is less likely to occur. That is, the presence of the void with a negative pressure that depresses the electrode current collector, even in the absence of such a void, makes it possible to improve the battery characteristics and suppress the breakage by the function of restraining the power generation element. Therefore, the battery according to the present aspect can achieve both high battery characteristics and high reliability.

In addition, for example, the internal pressure of the void may be lower than or equal to 0.9 atm.

Accordingly, the void causes a force to increase in the direction that restrains each layer of the power generation element.

In addition, for example, the battery may include a counter electrode current collector positioned on a side of the counter electrode layer in the power generation element, wherein the void is surrounded by the sealing material, the first surface, the electrode current collector, and the counter electrode current collector, and the counter electrode current collector may include a second recess curved to be recessed toward the void.

Accordingly, the force that restrains the power generation element acts from both the electrode layer side and the counter electrode layer side of the power generation element, making delamination or the like of the power generation element less likely to occur.

In addition, for example, the sealing material is in contact with a side surface of the electrode current collector, and when viewed from a normal direction of a main surface of the power generation element, a position of the side surface of the electrode current collector in contact with the sealing material and a position of the first surface may overlap.

Accordingly, the side surface, which is the end portion of the electrode current collector, is sealed with the sealing material at the position overlapping the first surface, so that the end portion of the electrode current collector, which is likely to be damaged due to being the corner of the battery, is protected.

In addition, for example, the first surface may include a side surface of the electrode layer, a side surface of the counter electrode layer, and a side surface of the solid electrolyte layer, when viewed from a normal direction of a main surface of the power generation element, a position of the side surface of the electrode layer, a position of the side surface of the counter electrode layer, and a position of the side surface of the solid electrolyte layer, which are included in the first surface, may overlap.

Accordingly, the electrode layer and the counter electrode layer are present up to the end portion on the side surface side of the power generation element, so the battery capacity is improved.

In addition, a battery system according to one aspect of the present disclosure includes a container including an internal space that serves as a reduced-pressure environment; and the battery described above disposed in the internal space.

Accordingly, since the battery system includes the battery described above, even if the internal space of the container is in a reduced-pressure environment, it is difficult to generate a delamination force on the power generation element due to the expansion of the void.

In addition, for example, a pressure of the reduced-pressure environment may be lower than or equal to 0.95 atm.

Accordingly, even if the battery is placed in a reduced-pressure environment with a pressure lower than or equal to 0.95 atm, it is difficult to generate a delamination force on the power generation element due to the expansion of the void.

In addition, for example, the internal pressure of the plurality of voids may be lower than or equal to a pressure of the reduced-pressure environment.

Accordingly, it is difficult to generate a delamination force due to the expansion of the void. In addition, a force in a direction of restraining each layer of the power generation element acts on the power generation element due to the void.

In addition, a method for manufacturing a battery according to one aspect of the present disclosure is a method for manufacturing a battery including a power generation element including an electrode layer, a counter electrode layer, and a solid electrolyte layer positioned between the electrode layer and the counter electrode layer, the method including: exposing a first surface to a reduced-pressure atmosphere, the first surface being a side surface of the power generation element in a stacked body including the power generation element; and sealing the first surface with a sealing material under the reduced-pressure atmosphere.

Accordingly, even if a void is formed between the first surface and the sealing material in the sealing, the internal pressure of the void can be reduced to a negative pressure lower than 1 atm. Specifically, when the first surface is sealed with the sealing material, the first surface is placed in a reduced-pressure atmosphere with a pressure lower than 1 atm, so even if a void is formed when the first surface is sealed, the internal pressure of the void becomes a negative pressure lower than 1 atm. Accordingly, when a void is formed in the battery, even if the manufactured battery is placed in a high-temperature environment or a reduced-pressure environment, it is less likely to generate a delamination force on the power generation element due to the expansion of the void.

In addition, for example, the method for manufacturing the battery further may include forming the stacked body including the power generation element in which the electrode layer and the counter electrode layer are stacked to face each other with the solid electrolyte layer interposed therebetween.

Accordingly, a stacked body of any shape can be prepared.

In addition, for example, a pressure of the reduced-pressure atmosphere may be lower than or equal to 0.9 atm.

Accordingly, even if a void is formed in the sealing, the internal pressure of the void to be formed can be reduced to a pressure lower than or equal to 0.9 atm.

In addition, for example, the pressure of the reduced-pressure atmosphere may be lower than or equal to 0.1 atm.

Accordingly, even if a void is formed in the sealing, the internal pressure of the void to be formed can be reduced to a pressure lower than or equal to 0.1 atm.

In addition, for example, in the sealing, the first surface may be sealed by immersing a portion of the stacked body in the sealing material.

Accordingly, it is possible to easily seal the first surface with the sealing material under a reduced-pressure environment.

Further, for example, in the sealing, the first surface may be sealed by applying the sealing material to the first surface.

This makes it possible to easily seal the first surface with the sealing material under a reduced-pressure environment.

Hereinafter, embodiments of the present disclosure will be described with reference to the drawings.

It should be noted that the embodiments described below are all comprehensive or specific examples. Numerical values, shapes, materials, components, arrangement positions and connection forms of components, steps, order of steps, and the like shown in the following embodiments are examples, and are not intended to limit the present disclosure. In addition, among the components in the following embodiments, components not described in independent claims will be described as optional components.

In addition, each figure is a schematic diagram and is not necessarily precisely illustrated. Therefore, for example, scales and the like do not necessarily match in each figure. In addition, in each figure, substantially the same configurations are denoted by the same reference numerals, and overlapping descriptions are omitted or simplified.

In addition, in the present specification, terms that indicate the relationship between elements such as parallel, terms that indicate the shape of elements such as rectangle, and numerical ranges are not expressions that express only strict meanings, but expressions that mean to include a difference in a substantially equivalent range, for example, a difference of about several percent.

In addition, in the present specification, "planar view" means the case when viewed from the normal direction of the main surface of the power generation element.

Embodiment 1

[Configuration]

First, the configuration of the battery according to the present embodiment will be described.

FIG. 1 is a cross-sectional view showing a schematic configuration of battery 1000 according to Embodiment 1.

As shown in FIG. 1, battery 1000 according to Embodiment 1 includes negative electrode current collector 210, positive electrode current collector 220, power generation element 100, and sealing material 700. Battery 1000 is, for example, an all-solid battery.

Void 230 is present in battery 1000. Details of void 230 will be described later.

Power generation element 100 is positioned between negative electrode current collector 210 and positive electrode current collector 220. Power generation element 100 includes positive electrode active material layer 120, negative electrode active material layer 110, and solid electrolyte layer 130 positioned between positive electrode active material layer 120 and negative electrode active material layer 110. Negative electrode active material layer 110 and positive electrode current collector 220 face each other with solid electrolyte layer 130 interposed therebetween. Negative electrode active material layer 110 is an example of an electrode layer, and positive electrode active material layer 120 is an example of a counter electrode layer. In addition, negative electrode current collector 210 is an example of an electrode current collector, and positive electrode current collector 220 is an example of a counter electrode current collector. It should be noted that positive electrode active material layer 120 and positive electrode current collector 220 may be the electrode layer and the electrode current collector, respectively, and negative electrode active material layer 110 and negative electrode current collector 210 may be the counter electrode layer and the counter electrode current collector, respectively.

In addition, in the present specification, negative electrode current collector 210 and positive electrode current collector 220 may be collectively referred to simply as "current collectors", and negative electrode active material layer 110 and positive electrode active material layer 120 are collectively referred to simply as "active material layers".

Negative electrode active material layer 110 contains, for example, a negative electrode active material as an electrode material. Negative electrode active material layer 110 is disposed to face positive electrode active material layer 120.

As the negative electrode active material contained in negative electrode active material layer 110, for example, a negative electrode active material such as graphite or metallic lithium can be used. Various materials capable of extracting and inserting ions such as lithium (Li) or magnesium (Mg) can be used as materials of the negative electrode active material.

In addition, as the material contained in negative electrode active material layer 110, for example, a solid electrolyte such as an inorganic solid electrolyte may be further used. As the inorganic solid electrolyte, for example, a sulfide solid electrolyte, an oxide solid electrolyte or the like can be used. As a sulfide solid electrolyte, for example, a mixture of lithium sulfide ($Li_2S$) and phosphorus pentasulfide ($P_2S_5$) can be used. In addition, at least one of a conductive material such as acetylene black and the like or a binding binder such as polyvinylidene fluoride and the like may be further used as the material contained in negative electrode active material layer 110.

Negative electrode active material layer 110 can be produced by applying a paste-like paint in which the material contained in negative electrode active material layer 110 is kneaded together with a solvent onto the surface of negative electrode current collector 210 and drying it. In order to increase the density of negative electrode active material layer 110, the negative electrode plate including negative electrode active material layer 110 and negative electrode current collector 210 may be pressed after drying. The thickness of negative electrode active material layer 110 is, for example, at least 5 μm and at most 300 μm, but is not limited thereto.

Positive electrode active material layer 120 contains, for example, a positive electrode active material as an electrode material. The positive electrode active material is a material that constitutes the counter electrode of the negative electrode active material. For example, positive electrode active materials such as lithium cobaltate composite oxide (LCO), lithium nickelate composite oxide (LNO), lithium manganate composite oxide (LMO), lithium-manganese-nickel composite oxide (LMNO), lithium-manganese-cobalt composite oxide (LMCO), lithium-nickel-cobalt composite oxide (LNCO), and lithium-nickel-manganese-cobalt composite oxide (LNMCO) are used as the positive electrode active material contained in positive electrode active material layer 120. Various materials capable of withdrawing and inserting ions such as Li or Mg can be used as the material of the positive electrode active material.

In addition, as the material contained in positive electrode active material layer 120, for example, a solid electrolyte such as an inorganic solid electrolyte may be used. As the inorganic solid electrolyte, the materials exemplified as the inorganic solid electrolyte used for the negative electrode active material mentioned above can be used. The surface of the positive electrode active material may be coated with a solid electrolyte. In addition, at least one of a conductive material such as acetylene black and the like or a binding binder such as polyvinylidene fluoride and the like may be further used as the material contained in positive electrode active material layer 120.

Positive electrode active material layer 120 can be produced by applying a paste-like paint in which the material contained in positive electrode active material layer 120 is kneaded together with a solvent onto the surface of positive electrode current collector 220 and drying it. In order to increase the density of positive electrode active material layer 120, the positive electrode plate including positive electrode active material layer 120 and positive electrode current collector 220 may be pressed after drying. The thickness of positive electrode active material layer 120 is, for example, at least 5 μm and at most 300 μm, but is not limited thereto.

Solid electrolyte layer 130 is disposed between negative electrode active material layer 110 and positive electrode active material layer 120. Solid electrolyte layer 130 is in contact with each of negative electrode active material layer 110 and positive electrode active material layer 120. The size and shape in a plan view of solid electrolyte layer 130 are the same as the size and shape in a plan view of negative electrode active material layer 110 and positive electrode active material layer 120, respectively. For that reason, when viewed from the normal direction of the main surface of power generation element 100, the position of the side surface of solid electrolyte layer 130 overlaps the position of each of the side surface of negative electrode active material layer 110 and the side surface of positive electrode active material layer 120. In the present specification, a side surface is a surface connecting two main surfaces of each component.

Solid electrolyte layer 130 is a layer containing an electrolyte material. As the electrolyte material, generally known electrolytes for batteries can be used. The thickness of solid electrolyte layer 130 may be at least 5 μm and at most 300 μm, or may be at least 5 μm and at most 100 μm. It should be noted that although solid electrolyte layer 130 is one layer in the example shown in FIG. 1, power generation element 100 may have a structure in which a plurality of solid electrolyte layers 130 are stacked.

Solid electrolyte layer 130 may contain a solid electrolyte. As the solid electrolyte, for example, a solid electrolyte such as an inorganic solid electrolyte can be used. As the inorganic solid electrolyte, the materials exemplified as the inorganic solid electrolyte used for the negative electrode active material mentioned above can be used. Solid electrolyte layer 130 may contain a binding binder such as polyvinylidene fluoride and the like in addition to the electrolyte material.

In battery 1000, negative electrode active material layer 110, positive electrode active material layer 120, and solid electrolyte layer 130 are maintained in the form of parallel plates. Accordingly, it is possible to suppress the occurrence of cracks or collapse due to curvature. It should be noted that negative electrode active material layer 110, positive electrode active material layer 120, and solid electrolyte layer 130 may be combined and smoothly curved.

Negative electrode current collector 210 and positive electrode current collector 220 are disposed facing power generation element 100 so as to sandwich power generation element 100 therebetween. In a plan view, negative electrode current collector 210 and positive electrode current collector 220 are each larger than power generation element 100, and entire power generation element 100 is positioned inside the outer peripheries of negative electrode current collector 210 and positive electrode current collector 220. That is, negative electrode current collector 210 and positive electrode current collector 220 each protrude from the outer periphery of power generation element 100 in a plan view.

Each of negative electrode current collector 210 and positive electrode current collector 220 is a member having conductivity. Each of negative electrode current collector 210 and positive electrode current collector 220 may be, for example, a thin film having conductivity. As a material included in negative electrode current collector 210 and positive electrode current collector 220, for example, metals such as stainless steel (SUS), aluminum (Al), copper (Cu), and nickel (Ni) can be used.

Negative electrode current collector 210 is positioned on negative electrode active material layer 110 side of power generation element 100. Negative electrode current collector

210 is disposed, for example, in contact with negative electrode active material layer 110. Negative electrode current collector 210 includes recess 211 that are curved so as to be recessed toward void 230 that will be described later. Recess 211 is an example of a first recess.

As negative electrode current collector 210, for example, metal foil such as SUS foil, Al foil, Cu foil, and Ni foil can be used. The thickness of negative electrode current collector 210 is, for example, at least 5 μm and at most 100 μm, but is not limited thereto. It should be noted that negative electrode current collector 210 may include, for example, a current collector layer that is a layer containing a conductive material in a portion in contact with negative electrode active material layer 110.

Positive electrode current collector 220 is positioned on the positive electrode active material layer 120 side of power generation element 100. Positive electrode current collector 220 is disposed, for example, in contact with positive electrode active material layer 120. Positive electrode current collector 220 includes recess 221 that are curved so as to be recessed toward void 230 that will be described later. Recess 221 is an example of a second recess.

As positive electrode current collector 220, for example, metal foil such as SUS foil, Al foil, Cu foil, and Ni foil can be used. The thickness of positive electrode current collector 220 is, for example, at least 5 μm and at most 100 μm, but is not limited thereto. It should be noted that positive electrode current collector 220 may include, for example, a current collector layer that is a layer containing a conductive material in a portion in contact with positive electrode active material layer 120.

Sealing material 700 seals first surface 100*a*, which is the side surface of power generation element 100. That is, sealing material 700 covers first surface 100*a* so that first surface 100*a* is not exposed to the outside world of battery 1000. In this specification, to seal first surface 100*a* means to cover first surface 100*a* so as not to expose it to the outside world of the battery. For that reason, first surface 100*a* is expressed to be sealed in any cases where sealing material 700 is in contact with and directly covers (that is, directly seals) at least a part of first surface 100*a*, and where sealing material 700 is not in contact with first surface 100*a* like battery 1000, and indirectly covers (that is, indirectly seals) first surface 100*a* via void 230 independent of the outside world.

First surface 100*a* is, for example, an outer end surface when viewed from the direction in which negative electrode active material layer 110, solid electrolyte layer 130, and positive electrode active material layer 120 are stacked and arranged, that is, the normal direction of the main surface of each layer. First surface 100*a* includes a side surface of negative electrode active material layer 110, a side surface of solid electrolyte layer 130, and a side surface of positive electrode active material layer 120. In the present embodiment, the side surface of negative electrode active material layer 110, the side surface of solid electrolyte layer 130, and the side surface of positive electrode active material layer 120 that are included in first surface 100*a* overlap with each other. Accordingly, since negative electrode active material layer 110 and positive electrode active material layer 120 are present up to the end portion on the side surface side of power generation element 100, the battery capacity is improved.

Sealing material 700 is positioned between positive electrode current collector 220 and negative electrode current collector 210 and is in contact with positive electrode current collector 220 and negative electrode current collector 210. Sealing material 700 may be in contact with at least one side surface of positive electrode current collector 220 or negative electrode current collector 210. In addition, sealing material 700 may cover a portion from at least one side surface of positive electrode current collector 220 or negative electrode current collector 210 to the end portion of the surface opposite to the side of power generation element 100. Sealing material 700 is not in contact with first surface 100*a* of power generation element 100. In this way, in battery 1000, first surface 100*a* is indirectly sealed with sealing material 700. Sealing material 700, for example, seals all side surfaces of power generation element 100. Power generation element 100 is, for example, in a flat rectangular parallelepiped shape, and in this case, sealing material 700 seals, for example, all four side surfaces (four first surfaces 100*a*) of power generation element 100. It should be noted that sealing material 700 may seal only at least one and at most three side surfaces out of the four side surfaces of power generation element 100.

For sealing material 700, for example, a generally known material for the battery sealing material can be used. Sealing material 700 includes, for example, an insulating resin material. The resin material is a material containing resin as a main component. The resin material includes, for example, at least one of epoxy resin, acrylic resin, polyimide resin, or silsesquioxane. For example, a thermosetting resin or an ultraviolet curable resin is used as the resin that is the main component of the resin material, but a thermoplastic resin may also be used. In addition, the resin material may contain a particulate metal oxide material. As metal oxide materials, silicon oxide, aluminum oxide, titanium oxide, zinc oxide, cerium oxide, iron oxide, tungsten oxide, zirconium oxide, calcium oxide, zeolite, glass, and the like can be used.

In battery 1000, void 230 surrounded by sealing material 700, first surface 100*a*, positive electrode current collector 220, and negative electrode current collector 210. Void 230 is positioned between first surface 100*a* and sealing material 700. Part of each of sealing material 700, first surface 100*a*, positive electrode current collector 220, and negative electrode current collector 210 is exposed to void 230. Void 230 is an independent air bubble (hollow portion) formed by inner surfaces composed of surface 700*a* of sealing material 700 on the side of first surface 100*a*, first surface 100*a*, surface 210*a* of negative electrode current collector 210 on the side of power generation element 100, and surface 220*a* of positive electrode current collector 220 on the side of power generation element 100.

Void 230 has a negative pressure lower than the atmospheric pressure. That is, the internal pressure of void 230 is lower than 1 atm. In this way, since void 230 is at a negative pressure, the portions of negative electrode current collector 210 and positive electrode current collector 220 adjacent to void 230 are curved so as to be recessed toward void 230 to form recess 211 in negative electrode current collector 210 and to form recess 221 in positive electrode current collector 220. In this way, by negative electrode current collector 210 and positive electrode current collector 220 having recess 211 and recess 221, respectively, the force restraining power generating element 100 acts from both the side of negative electrode active material layer 110 and the side of positive electrode active material layer 120 of power generating element 100, as described below in details, making it more difficult for delamination and the like to occur.

From the viewpoint of increasing the reliability of battery 1000, the internal pressure of void 230 may be 0.9 atm or less, 0.5 atm or less, or 0.1 atm or less. In addition, the internal pressure of void 230 is, for example, greater than 0 atm. It should be noted that in the present specification, the pressure such as the internal pressure of void 230 is the pressure at normal temperature. Normal temperature is, for example, 23° C. In addition, in the present specification, the numerical values of the pressure such as the internal pressure of void 230 are numerical values in absolute pressure.

[Variation 1]

Variation 1 of Embodiment 1 will be described below. It should be noted that in the following description of Variation 1, differences from Embodiment 1 will be mainly described, and descriptions of common points will be omitted or simplified.

Figure 2:
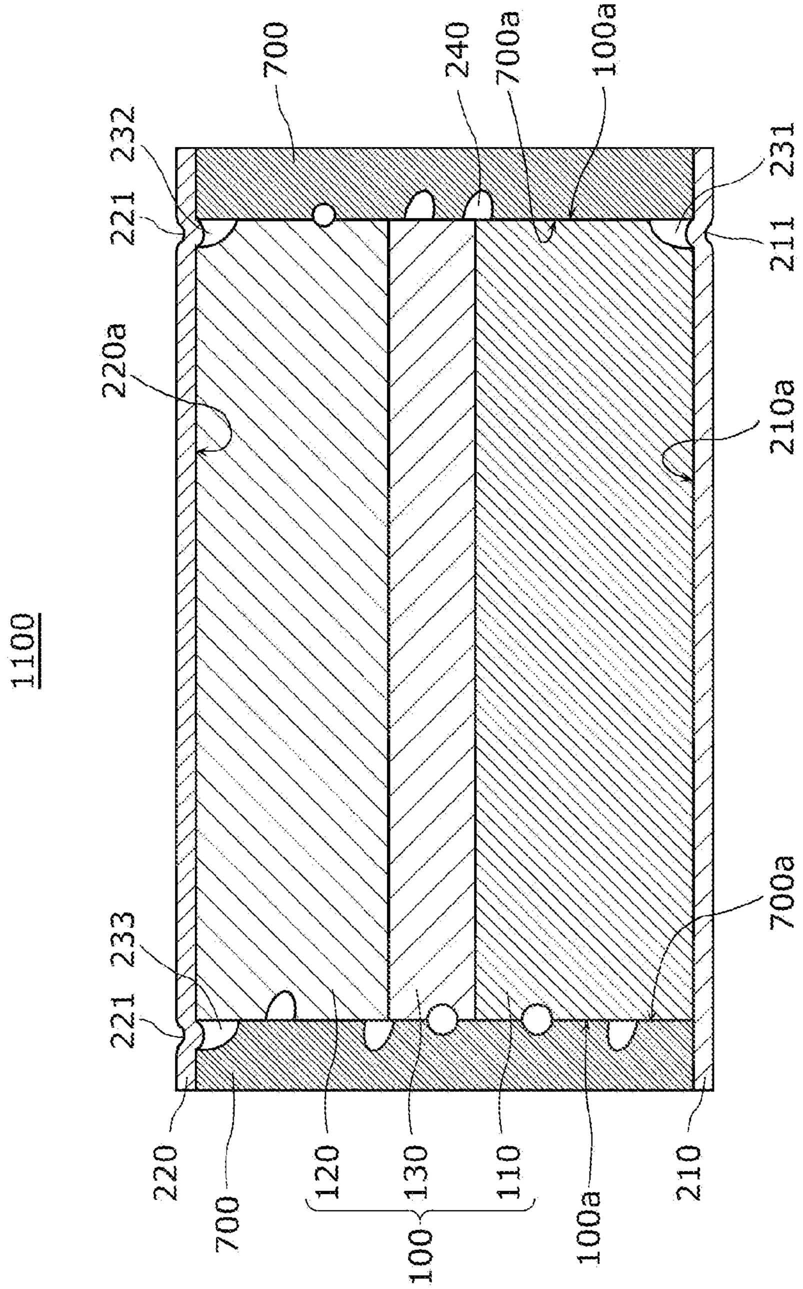
FIG. 2 is a cross-sectional view showing a schematic configuration of a battery according to Variation 1 of Embodiment 1.

FIG. 2 is a cross-sectional view showing a schematic configuration of battery 1100 according to Variation 1 of Embodiment 1.

As shown in FIG. 2, battery 1100 is different from battery 1000 according to Embodiment 1 mainly in that voids 231, 232, 233, and 240 are present instead of void 230.

In battery 1100, sealing material 700 is in contact with part of first surface 100*a*. In this way, in battery 1100, first surface 100*a* is directly sealed with sealing material 700.

In battery 1100, void 231 surrounded by sealing material 700, first surface 100*a*, and negative electrode current collector 210 is present. Void 231 is positioned between first surface 100*a* and sealing material 700. Parts of sealing material 700, first surface 100*a* and negative electrode current collector 210 are exposed in void 231. Void 231 is an independent air bubble formed by inner surfaces composed of surface 700*a* of sealing material 700 on the side of first surface 100*a*, first surface 100*a*, and surface 210*a* of negative electrode current collector 210 on the side of power generation element 100. Void 231 is formed at a portion where first surface 100*a* is depressed inside power generation element 100.

Negative electrode current collector 210 includes recess 211 curved so as to be recessed toward void 231.

In addition, in battery 1100, voids 232 and 233 surrounded by sealing material 700, first surface 100*a*, and positive electrode current collector 220 are present. Void 232 and void 233 are positioned between first surface 100*a* and sealing material 700, respectively. Part of each of sealing material 700, first surface 100*a* and positive electrode current collector 220 is exposed in void 232 and void 233. Void 232 and void 233 are each independent air bubbles formed by inner surfaces composed of surface 700*a* of sealing material 700 on the side of first surface 100*a*, first surface 100*a*, and surface 220*a* of positive electrode current collector 220 on the side of power generation element 100. Void 232 is formed at a portion where first surface 100*a* is depressed inside power generation element 100. In addition, void 233 is formed so as to protrude from first surface 100*a* to sealing material 700.

Positive electrode current collector 220 includes recess 221 curved so as to be recessed toward void 232 or void 233.

In addition, in battery 1100, void 240 surrounded by sealing material 700 and first surface 100*a* is present. Void 240 is positioned between first surface 100*a* and sealing material 700. Parts of sealing material 700 and first surface 100*a* are exposed in void 240. Void 240 is an independent air bubble formed by inner surfaces composed of surface 700*a* of sealing material 700 on the side of first surface 100*a* and first surface 100*a*. Void 240 is formed at a portion where at least one of first surface 100*a* or surface 700*a* is depressed.

Voids 231, 232, 233, and 240 each have a negative pressure lower than the atmospheric pressure. That is, the internal pressure of each of voids 231, 232, 233, and 240 is lower than 1 atm. From the viewpoint of improving the reliability of battery 1100, the internal pressure of each of voids 231, 232, 233, and 240 may be lower than or equal to 0.9 atm, lower than or equal to 0.5 atm, or lower than or equal to 0.1 atm. In addition, the internal pressure of each of voids 231, 232, 233, and 240 is, for example, greater than 0 atm.

It should be noted that in battery 1100, there may be voids that are not present among voids 231, 232, 233, and 240, and for example, at least one of voids 231, 232, or 233 may be present.

[Variation 2]

Variation 2 of Embodiment 1 will be described below. In the following description of Variation 2, differences from Embodiment 1 and Variation 1 of Embodiment 1 will be mainly described, and descriptions of common points will be omitted or simplified.

Figure 3:
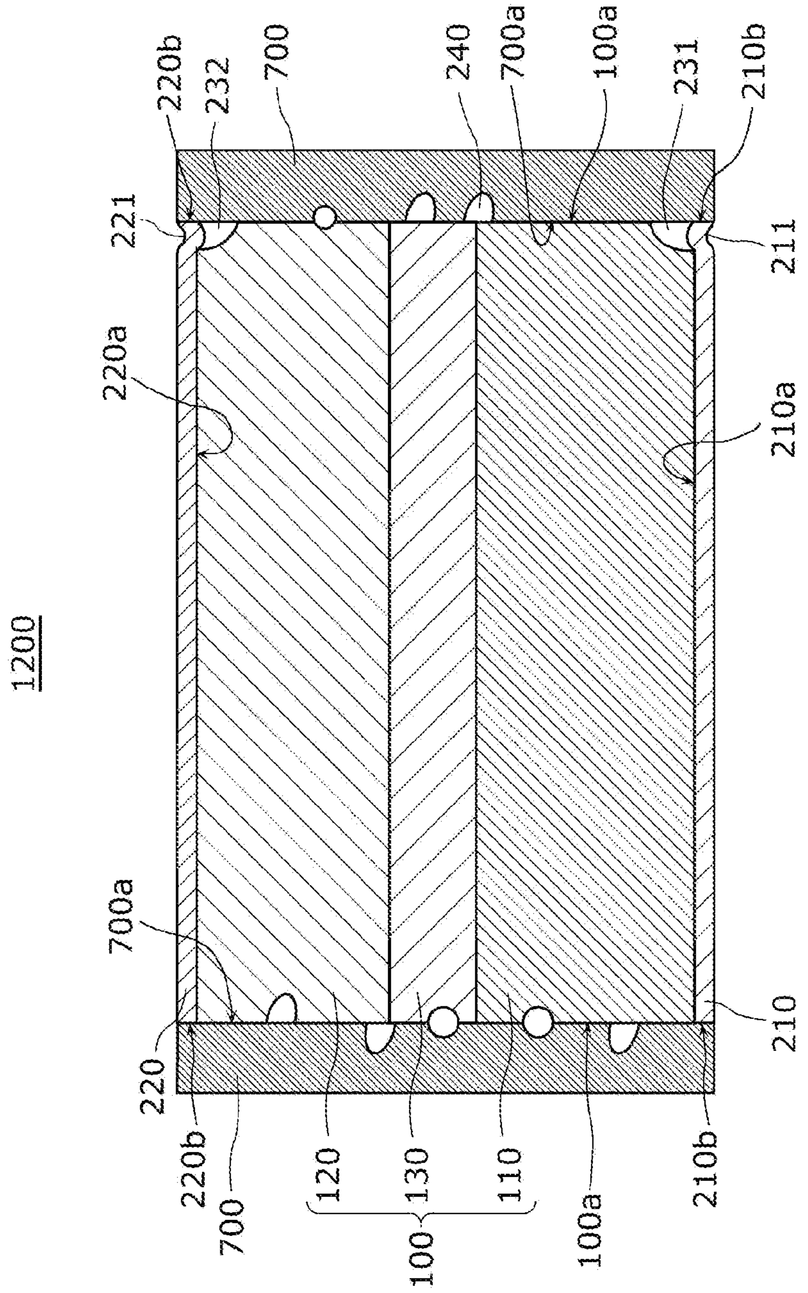
FIG. 3 is a cross-sectional view showing a schematic configuration of a battery according to Variation 2 of Embodiment 1.

FIG. 3 is a cross-sectional view showing a schematic configuration of battery 1200 according to Variation 2 of Embodiment 1.

As shown in FIG. 3, battery 1200 is different from battery 1000 according to Embodiment 1 mainly in that voids 231, 232, and 240 are present instead of void 230. In addition, when viewed from the normal direction of the main surface of power generation element 100, battery 1200 is also different from battery 1000 according to Embodiment 1 in that first surface 100*a* overlaps with side surface 210*b* of negative electrode current collector 210 and side surface 220*b* of positive electrode current collector 220.

In battery 1200, sealing material 700 is in contact with part of first surface 100*a*. In this way, in battery 1200, first surface 100*a* is directly sealed with sealing material 700.

In battery 1200, side surface 210*b* of negative electrode current collector 210 and side surface 220*b* of positive electrode current collector 220 respectively overlap first surface 100*a* when viewed from the normal direction of the main surface of power generation element 100. In a plan view, the outer periphery of each of negative electrode current collector 210 and positive electrode current collector 220 matches, for example, the outer periphery of power generation element 100. In addition, sealing material 700 is in contact with side surface 210*b* and side surface 220*b*. That is, sealing material 700 seals first surface 100*a*, side surface 210*b*, and side surface 220*b*. In this way, since side surface 210*b* and side surface 220*b*, which are the end portions of the current collector, are sealed with sealing material 700 at positions overlapping with first surface 100*a*, the end portions of the current collector that serve as the corners of battery 1200 are protected.

In addition, in battery 1200, voids 231, 232, and 240 similar to those in Variation 1 of Embodiment 1 are present.

It should be noted that in battery 1200, there may be voids that are not present among voids 231, 232, and 240, and for example, at least one of voids 231 or 232 may be present.

[Effects, Etc.]

Next, the effects of batteries 1000, 1100, and 1200 will be described. In batteries 1000, 1100, and 1200, power generation element 100 can be reinforced by sealing first surface 100*a* with sealing material 700. Since first surface 100*a* includes the side surface of each layer of power generation element 100, it is one of the locations where the mechanical strength of power generation element 100 may be the weakest.

Here, the effect of the negative pressure in the voids present in the battery according to the present embodiment will be explained using the explanation of the batteries according to the comparative examples as well. Voids with an internal pressure greater than or equal to 1 atm are present in the batteries according to the comparative examples.

Figure 4:
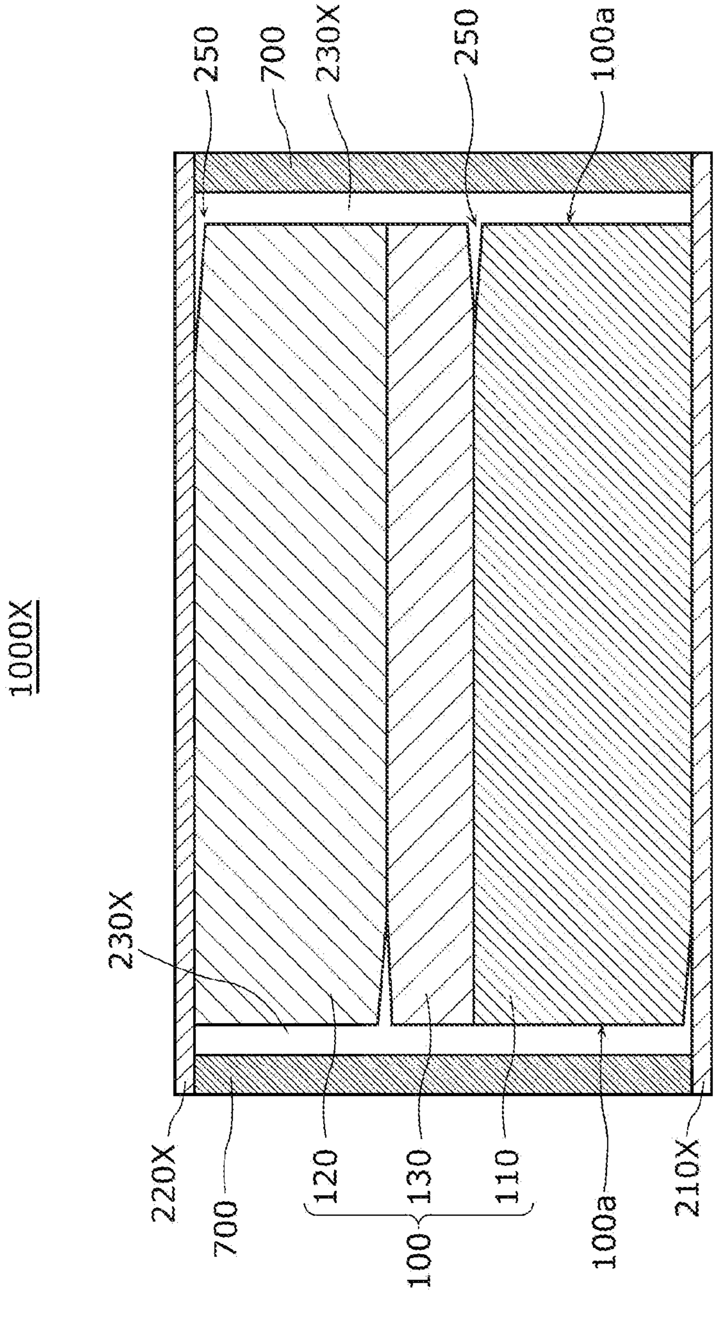
FIG. 4 is a cross-sectional view showing a schematic configuration of a battery according to Comparative Example 1.
Figure 5:
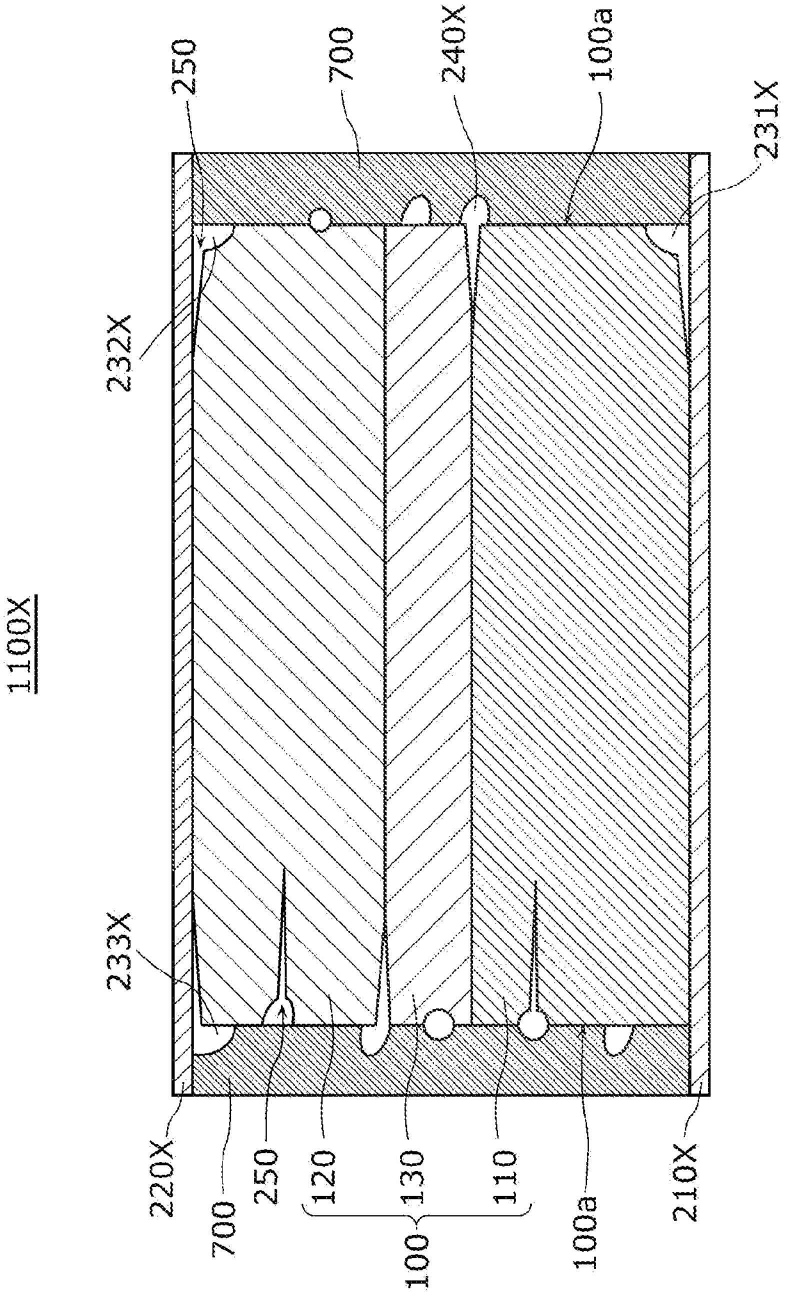
FIG. 5 is a cross-sectional view showing a schematic configuration of a battery according to Comparative Example 2.

FIG. 4 is a cross-sectional view showing a schematic configuration of battery 1000X according to Comparative Example 1. FIG. 5 is a cross-sectional view showing a schematic configuration of battery 1100X according to Comparative Example 2. FIG. 4 and FIG. are diagrams showing the state after batteries 1000X and 1100X are manufactured and used for a while, respectively. In battery 1000X, instead of void 230 of battery 1000 according to Embodiment 1, void 230X having an internal pressure greater than or equal to 1 atm is present at the same location. In addition, in battery 1100X, instead of voids 231, 232, 233, and 240 of battery 1100 according to Variation 1 of Embodiment 1, voids 231X, 232X, 233X, and 240X having an internal pressure greater than or equal to 1 atm are present in the same locations. In battery 1000X and battery 1100X, negative electrode current collector 210X and positive electrode current collector 220X do not include recess 211 and recess 221, respectively.

In batteries 1000X and 1100X, the plurality of delamination locations 250 are not formed immediately after production. However, since the internal pressure of the void such as void 230X is greater than or equal to 1 atm, when the temperature becomes high due to the usage environment, atmospheric temperature, heat generation, and the like, the gas in the void attempts to thermally expand, and the internal pressure of the void becomes significantly higher than the atmospheric pressure, creating a delamination force between and within each layer of power generation element 100. The expansion of the gas in the void such as void 230X occurs not only at high temperatures but also when battery 1000X is placed in a reduced-pressure environment such as high altitude or outer space. For that reason, as schematically shown in FIGS. 4 and 5, due to an increase in the internal pressure of the void such as void 230X, interlayer delamination and intralayer delamination occur, and a plurality of delamination locations 250 are formed. Intralayer delamination is, for example, delamination at an interface between materials included in each layer within each layer.

On the other hand, in batteries 1000, 1100, and 1200 according to Embodiment 1 and the variations mentioned above, the void such as void 230 in contact with first surface 100*a* has a negative pressure. For that reason, unlike the void in the battery according to the comparative example mentioned above, even under a high-temperature environment or a reduced-pressure environment, the void is less likely to exert a delamination force on power generation element 100. For that reason, in batteries 1000, 1100, and 1200, interlayer delamination and intralayer delamination in power generation element 100 due to expansion of the void are less likely to occur.

In addition, since the void with a negative pressure such as void 230 is in contact with negative electrode current collector 210 and/or positive electrode current collector 220, a force acts to attract negative electrode current collector 210 and/or positive electrode current collector 220 toward the side of power generation element 100 to form recess 211 and/or recess 221. As a result, a force acts in a direction that restrains each layer of power generation element 100 by the void with a negative pressure such as void 230 and recess 211 and/or recesses 221 to allow the resistances between and within the layers of power generation element 100 to be reduced, and even if positive electrode active material layer 120 and negative electrode active material layer 110 expand and contract due to repeated charge and discharge cycles, interlayer delamination or the like is less likely to occur. That is, the presence of the void with a negative pressure such as void 230 that depresses negative electrode current collector 210 and/or positive electrode current collector 220, even in the absence of such a void, makes it possible to improve the battery characteristics and suppress the breakage by the function of restraining power generation element 100. In addition, an external restraining force is applied to power generation element 100 even without a restraint or the like, and a decrease in battery capacity per unit volume and per unit weight due to the provision of a restraint or the like can be avoided.

As described above, battery 1000, battery 1100, and battery 1200 can achieve both high battery characteristics and high reliability.

[Manufacturing Method]

Next, a method for manufacturing a battery according to the present embodiment will be described.

Figure 6:
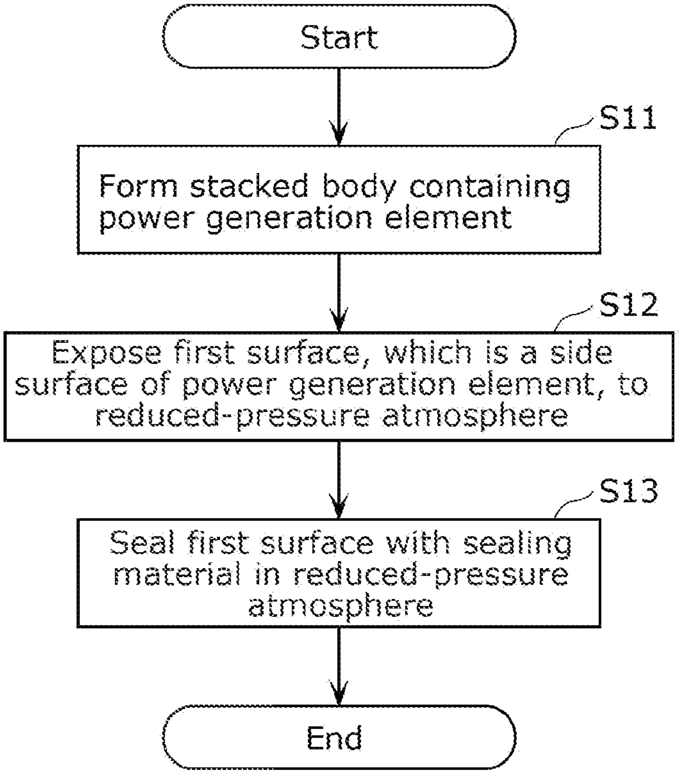
FIG. 6 is a flowchart of a method for manufacturing a battery according to Embodiment 1.

FIG. 6 is a flowchart of a method for manufacturing a battery according to the present embodiment. The method for manufacturing the battery according to the present embodiment includes, for example, a stacking step, a pressure reduction step, and a sealing step.

As shown in FIG. 6, first, in the stacking step, a stacked body including power generation element 100 in which positive electrode active material layer 120 and negative electrode active material layer 110 are stacked so as to face each other with solid electrolyte layer 130 interposed therebetween is formed. (Step S11). For example, like stacked body 300 and stacked body 310 to be mentioned later, the stacked body includes power generation element 100, positive electrode current collector 220 positioned on the side of positive electrode active material layer 120 of power generation element 100, and negative electrode current collector 210 positioned on the side of negative electrode active material layer 110 of power generation element 100. It should be noted that the stacked body may include at least one of positive electrode current collector 220 and negative electrode current collector 210.

In the stacking step, for example, a stacked body including power generation element 100 is formed by sequentially stacking negative electrode current collector 210, negative electrode active material layer 110, solid electrolyte layer 130, positive electrode active material layer 120, and positive electrode current collector 220 in this order. The stacked body is formed by, for example, coating a paste-like paint obtained by kneading the respective materials of negative electrode active material layer 110, positive electrode active material layer 120, and solid electrolyte layer 130 together with a solvent on the surface of the current collector or each layer, and drying them. In addition, a stacked body including power generation element 100 may be formed by preparing a negative electrode plate in which negative electrode active material layer 110 and solid electrolyte layer 130 are stacked in this order on negative electrode current collector 210, and a positive electrode plate in which positive electrode active material layer 120 and solid electrolyte layer 130 are stacked on positive electrode current collector 220, and bonding the negative electrode plate and the positive electrode plate with solid electrolyte layer 130 interposed therebetween. In the stacking step, the formation of each layer and the bonding of the negative plate and the positive plate may be performed by pressing for densification and compression bonding.

Next, in the pressure reduction step, first surface 100*a*, which is the side surface of power generation element 100 in the stacked body, is exposed to a reduced-pressure atmosphere (step S12). Exposing first surface 100*a* to a reduced-pressure atmosphere means exposing first surface 100*a* to a space that has been reduced to a reduced-pressure of lower than 1 atm by, for example, exhausting gas from the space. In order to expose first surface 100*a* to the reduced-pressure atmosphere, for example, the entire stacked body is disposed in a space with the reduced-pressure atmosphere. Alternatively, first surface 100*a* may be exposed to the reduced-pressure atmosphere by placing a portion of the stacked body including first surface 100*a* in a container or the like whose interior is in a reduced-pressure atmosphere.

Next, in the sealing step, first surface 100*a* is sealed with sealing material 700 under a reduced-pressure atmosphere (step S13). In addition, in the sealing step, for example, first surface 100*a* is sealed with sealing material 700 so that at least part of first surface 100*a* is spaced apart from sealing material 700. Accordingly, voids such as void 230 are formed. Sealing first surface 100*a* under the reduced-pressure atmosphere makes the internal pressure of the void formed in the sealing step negative pressure, that is, lower than 1 atm.

The pressure of the reduced-pressure atmosphere may be lower than or equal to 0.9 atm, lower than or equal to 0.5 atm, or lower than or equal to 0.1 atm. This can further reduce the internal pressure of the void such as void 230 formed in the sealing step. In addition, the pressure of the reduced-pressure atmosphere is, for example, greater than 0 atm.

In the sealing step, for example, first surface 100*a* is sealed by immersing part of the stacked body in sealing material 700. In addition, in the sealing step, first surface 100*a* is sealed by applying sealing material 700 to first surface 100*a*. Examples of methods for applying sealing material 700 include a doctor blade method, a calendar method, a spin coat method, a dip coat method, an ink jet method, an offset method, a die coat method, a spray method, and the like.

Battery 1000, battery 1100, battery 1200, which are mentioned above, or the like can be obtained through such a stacking step, pressure reduction step, and sealing step.

Here, a method of sealing first surface 100*a* using sealing material 700 will be described in details with reference to FIG. 7 to FIG. 9.

First, Example 1 of a sealing method for first surface 100*a* will be described. FIG. 7 is a schematic diagram for explaining Example 1 of a sealing method for first surface 100*a*. FIG. 7 is a diagram for explaining a sealing method when manufacturing batteries 1000 and 1100 mentioned above. To manufacture battery 1000 and battery 1100, stacked body 300 is formed in the manner mentioned above. In stacked body 300, negative electrode current collector 210 and positive electrode current collector 220 protrude from power generation element 100 as in batteries 1000 and 1100.

Figure 7:
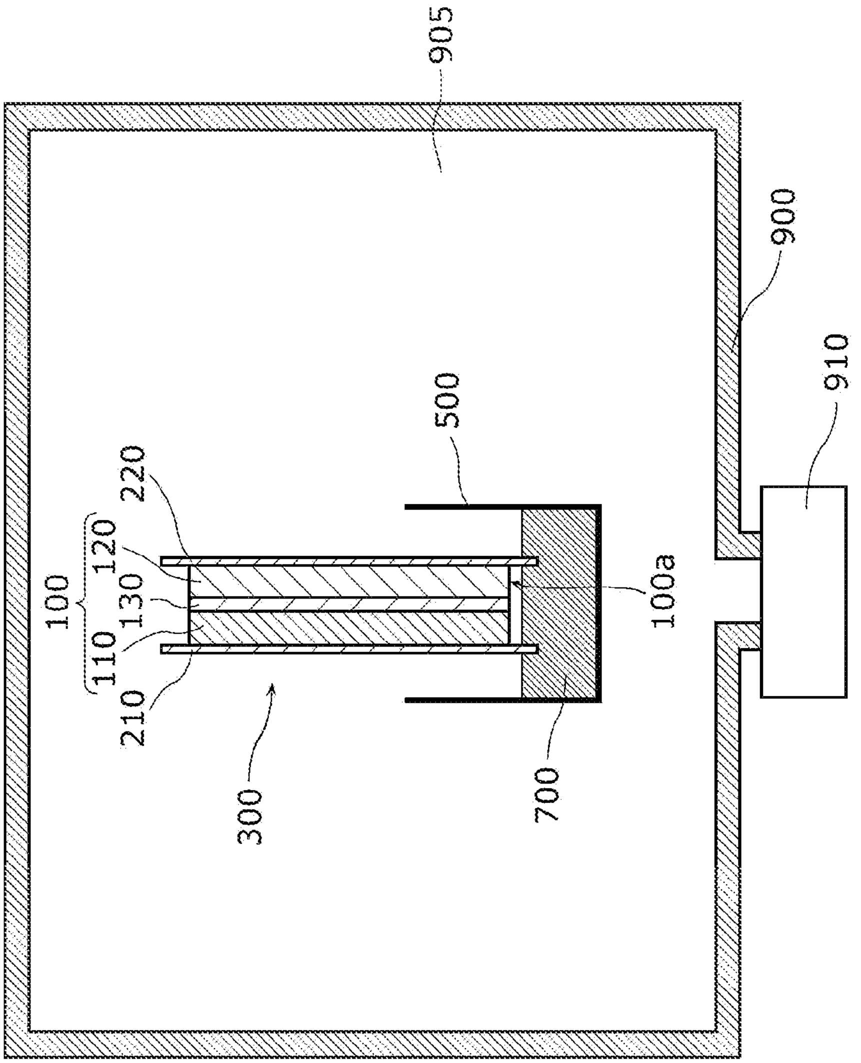
FIG. 7 is a schematic diagram for explaining Example 1 of the method for sealing the first surface according to Embodiment 1.

As shown in FIG. 7, dipping device 500 is installed in internal space 905 of vacuum chamber 900 connected to vacuum pump 910. Vacuum chamber 900 is provided with, for example, a door or the like (not shown) for taking stacked body 300 in and out.

In order to seal first surface 100*a*, first, prepared stacked body 300 is placed in dipping device 500. For example, dipping device 500 is provided with a driving arm or the like (not shown), and stacked body 300 is placed on the driving arm or the like. In addition, in dipping device 500, liquid sealing material 700 is placed in a container. Liquid sealing material 700 is, for example, a resin material containing a thermosetting resin or an ultraviolet curable resin before being cured. Liquid sealing material 700 may be a resin material containing a thermoplastic resin melted by being heated.

Next, the gas in internal space 905 is exhausted by vacuum pump 910 to make internal space 905 into a reduced-pressure atmosphere (for example, a vacuum atmosphere). After internal space 905 is brought into a reduced-pressure atmosphere, a portion of stacked body 300 is immersed in sealing material 700 using dipping device 500. For example, part of stacked body 300 is immersed in sealing material 700 while maintaining first surface 100*a* and the liquid surface of sealing material 700 parallel to each other. Then, stacked body 300 with sealing material 700 formed thereon is taken out, and if necessary, a curing process of sealing material 700, the removal of sealing material 700 adhering to unnecessary portions, and the like are performed, whereby battery 1000 or battery 1100 is obtained.

In the case of manufacturing battery 1000, a portion, which protrudes outside first surface 100*a* of power generation element 100, of negative electrode current collector 210 and positive electrode current collector 220 in stacked body 300 is partly immersed in sealing material 700. Accordingly, sealing material 700 is disposed between negative electrode current collector 210 and positive electrode current collector 220 to seal first surface 100*a*. In addition, by adjusting the depth at which stacked body 300 is immersed in sealing material 700, specifically, stacked body 300 is immersed in sealing material 700 so that first surface 100*a* is not immersed in sealing material 700. Accordingly, void 230 is formed and battery 1000 is obtained. In this way, first surface 100*a* can be sealed and void 230 can be formed only by immersing a portion of stacked body 300 in sealing material 700 under a reduced-pressure atmosphere, so that battery 1000 can be easily manufactured.

In addition, when manufacturing battery 1100, for example, stacked body 300 having minute depressions formed on first surface 100*a* is prepared, and stacked body 300 is immersed in sealing material 100*a* so that first surface 100*a* is immersed in sealing material 700. Accordingly, voids 231, 232, 233, and 240 are formed, and battery 1100 is obtained. In addition, by adjusting the wettability between first surface 100*a* and sealing material 700 so that first surface 100*a* is not completely wetted by sealing material 700, voids 231, 232, 233, and 240 may be formed. In addition, when stacked body 300 is immersed in sealing material 700, the surrounding atmosphere may be involved to form voids 231, 232, 233, and 240. In addition, voids 231, 232, 233, and 240 may be formed by patterning sealing material 700 in advance at positions not in contact with voids 231, 232, 233, and 240 of first surface 100*a*, and immersing stacked body 310 including patterned sealing material 700 in liquid sealing material 310. At this time, stacked body 310 is immersed in liquid sealing material 700 so that patterned sealing material 700 is immersed in liquid sealing material 700 and first surface 100*a* is not immersed in liquid sealing material 700.

Next, Example 2 of the sealing method for first surface 100*a* will be described. FIG. 8 is a schematic diagram for explaining Example 2 of the sealing method for first surface 100*a*. FIG. 8 is a diagram for explaining a sealing method when manufacturing battery 1200 mentioned above. In Example 2 of the sealing method for first surface 100*a*, dipping device 500 installed in internal space 905 of vacuum chamber 900 is used as in Example 1 mentioned above. To manufacture battery 1200, stacked body 310 is formed in the manner mentioned above. In stacked body 310, as in battery 1200, the positions of the side surfaces of negative electrode current collector 210 and positive electrode current collector 220 overlap with first surface 100*a* which is the side surface of power generation element 100 when viewed from the direction normal to the main surface of power generation element 100.

Figure 8:
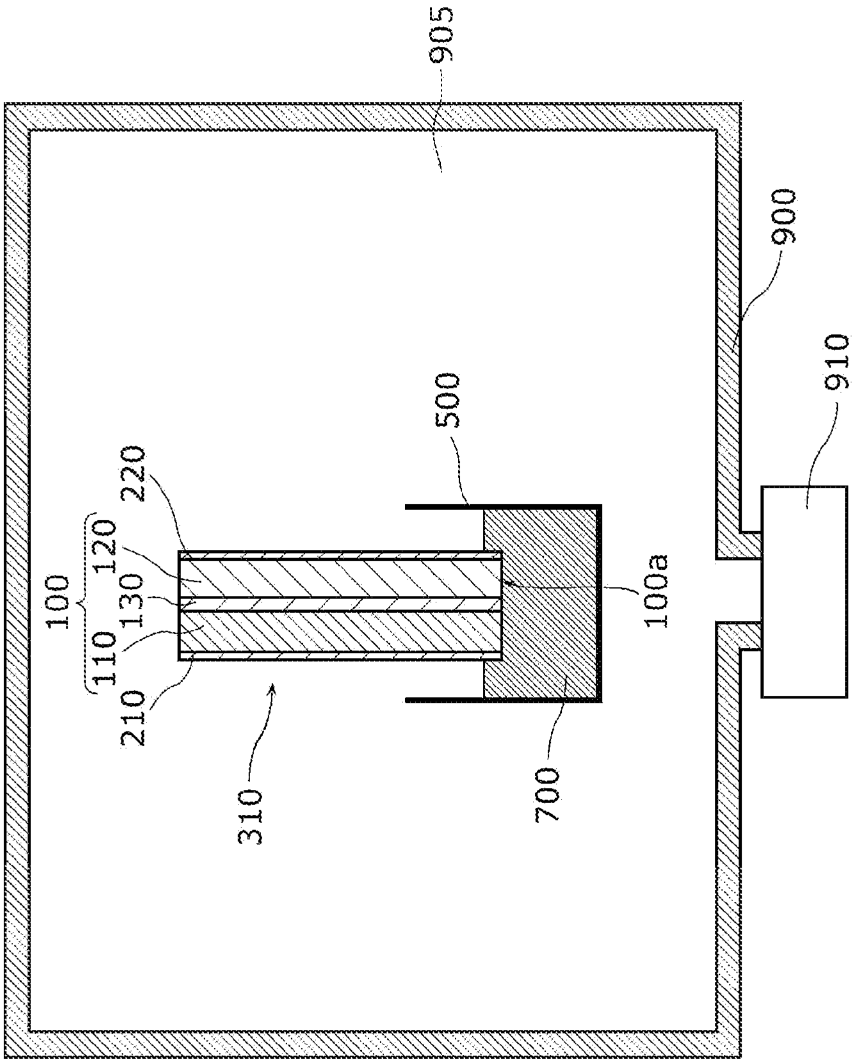
FIG. 8 is a schematic diagram for explaining Example 2 of the method for sealing the first surface according to Embodiment 1.

As shown in FIG. 8, in order to seal first surface 100*a*, first, prepared stacked body 310 is placed in dipping device 500. Next, the gas in internal space 905 is exhausted by vacuum pump 910 to make internal space 905 into a reduced-pressure atmosphere. After internal space 905 is brought into a reduced-pressure atmosphere, a portion of stacked body 310 is immersed into sealing material 700 so that first surface 100*a* is immersed in sealing material 700 while maintaining first surface 100*a* and the liquid surface of sealing material 700 parallel to each other. Accordingly, first surface 100*a* is sealed with sealing material 700. Then, stacked body 310 with sealing material 700 formed thereon is taken out, and if necessary, a curing process of sealing material 700, the removal of sealing material 700 adhering to unnecessary portions, and the like are performed, whereby battery 1200 is obtained. In manufacturing battery 1200, stacked body 310 having first surface 100*a* formed with minute depressions is prepared in the same manner as in the manufacturing of battery 1100 mentioned above, the wettability between first surface 100*a* and sealing material 700 is adjusted, or voids 231, 232, and 240 are formed by patterning sealing material 700 on first surface 100*a* in advance.

Next, Example 3 of the sealing method for first surface 100*a* will be described. FIG. 9 is a schematic diagram for explaining Example 3 of the sealing method for first surface 100*a*. FIG. 9 is a diagram for explaining the sealing method when manufacturing battery 1200 mentioned above. In Example 3 of the sealing method for first surface 100*a*, vacuum chamber 900 is used in the same manner as in Example 1 and Example 2 mentioned above. In addition, in Example 3 of the sealing method for first surface 100*a*, stacked body 310 is prepared in the same manner as in Example 2.

Figure 9:
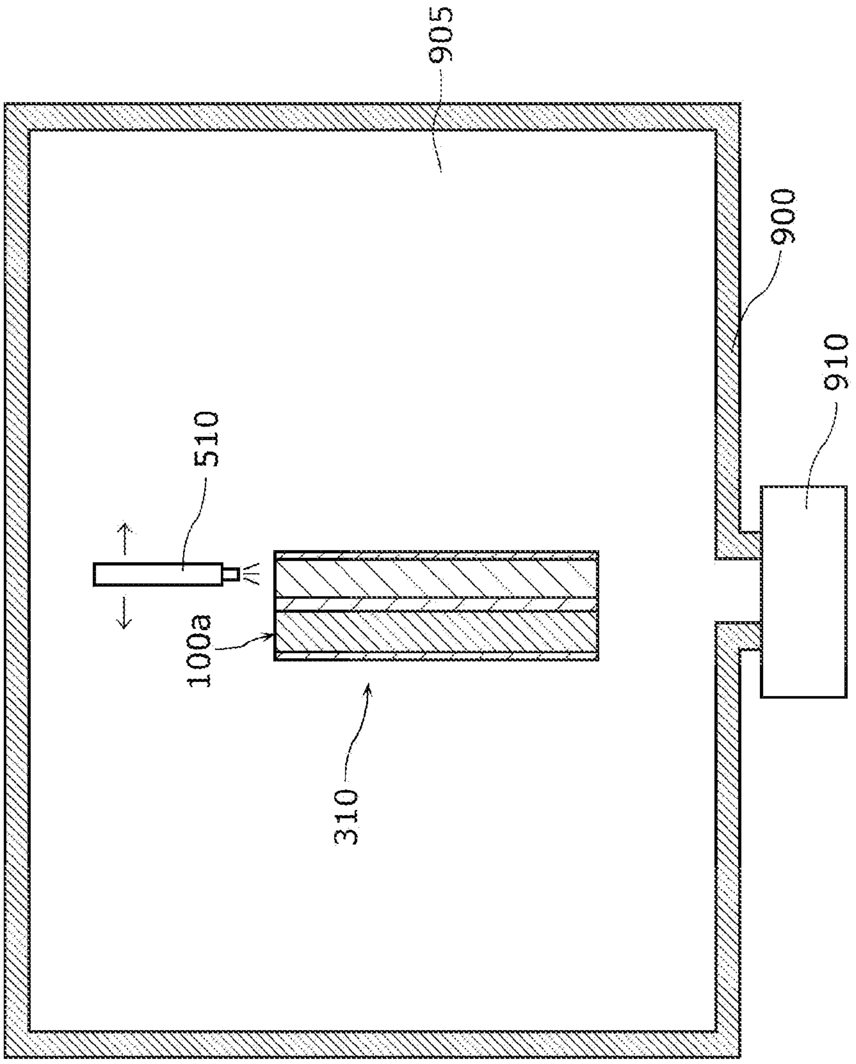
FIG. 9 is a schematic diagram for explaining Example 3 of the method for sealing the first surface according to Embodiment 1.

As shown in FIG. 9, application device 510 is installed in internal space 905 of vacuum chamber 900. Application device 510 is a device for applying liquid sealing material 700. First, in order to seal first surface 100*a*, stacked body 310 is placed in internal space 905 of vacuum chamber 900. Next, the gas in internal space 905 is exhausted by vacuum pump 910 to make internal space 905 into a reduced-pressure atmosphere. After internal space 905 is brought into a reduced-pressure atmosphere, application device 510 is used to apply sealing material 700 to first surface 100*a*. Accordingly, first surface 100*a* is sealed with sealing material 700. In application device 510, for example, the nozzle for applying sealing material 700 is driven in the direction along first surface 100*a* as indicated by the arrow in FIG. 9. Then, stacked body 310 with sealing material 700 formed thereon is taken out, and if necessary, a curing process of sealing material 700 and the like is performed, whereby battery 1200 is obtained. In manufacturing battery 1200, stacked body 310 having first surface 100*a* formed with minute depressions is prepared in the same manner as in the manufacturing of battery 1100 mentioned above, the wettability between first surface 100*a* and sealing material 700 adjusted, or the like, whereby voids 231, 232, and 240 are formed. In addition, voids 231, 232, and 240 may be formed by patterning sealing material 700 using application device 510. In this way, only by applying sealing material 700 to first surface 100*a* under a reduced-pressure atmosphere, the sealing of first surface 100*a* and the formation of voids 231, 232, and 240 can be achieved, so that battery 1200 can be easily manufactured.

In addition, in Example 3, it is also possible to manufacture battery 1100 by using stacked body 300 instead of stacked body 310.

It should be noted that the method for manufacturing the battery according to the present embodiment is not limited to the examples mentioned above. For example, in the method of sealing first surface 100 internal space 905 may be replaced with an inert gas such as argon or nitrogen before internal space 905 is brought into a reduced-pressure atmosphere. Alternatively, the void may be formed by joining sealing material 700 having minute depressions formed on the surface in advance to first surface 100*a* under a reduced-pressure atmosphere.

In addition, it is not necessary to dispose entire stacked body 300 or stacked body 310 in vacuum chamber 900 as described above, and for example, a container with an opening into which a portion of stacked body 300 or stacked body 310 is placed is prepared and the opening is sealed with a portion of stacked body 300 or stacked body 310 in the opening. Then, the internal space of the container may be evacuated, and first surface 100*a* may be sealed by immersing stacked body 300 or stacked body 310 in sealing material 700 placed in the container.

In addition, although the description mentioned above refers to single-cell batteries 1000, 1100, and 1200, which have single power generation element 100, the configuration and manufacturing method of the battery according to the present embodiment are also effective in a stacked battery having a configuration in which a plurality of power generation elements 100 are stacked in a series structure or a parallel structure via a current collector. When the battery includes a plurality of power generation elements 100, first surface 100*a* of each of the plurality of power generation elements 100 may be individually sealed with sealing material 700 before stacking the plurality of power generation elements 100, or the plurality of power generation elements 100 may be stacked before first surface 100*a* of each of the plurality of power generation elements 100 may be sealed in a lump with sealing material 700.

In addition, by using the manufacturing method according to the present embodiment, even if a void other than void 230 and the like formed as described above is formed unintentionally due to process conditions or the like, the internal pressure of the void can be reduced to a pressure lower than 1 atm, so that it is possible to suppress the generation of a delamination force to the power generation element due to the expansion of the void.

Embodiment 2

Next, Embodiment 2 will be described. In Embodiment 2, a battery system using the battery according to Embodiment 1 is described. Since battery 1000 and the like according to Embodiment 1 mentioned above include a void with a negative pressure such as void 230, they are excellent in environmental resistance and provide various advantages in actual operation.

Figure 10:
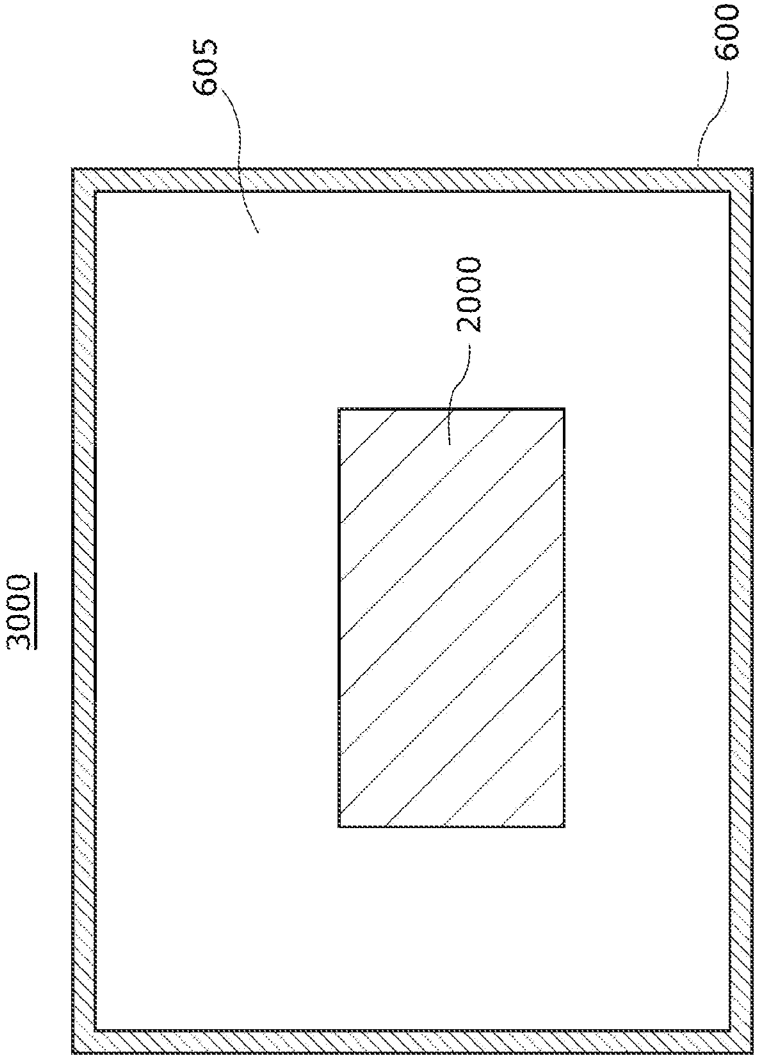
FIG. 10 is a schematic diagram showing a schematic configuration of a battery system according to Embodiment 2.

FIG. 10 is a schematic diagram showing a schematic configuration of battery system 3000 according to Embodiment 2. As shown in FIG. 10, battery system 3000 includes battery 2000 and container 600.

Battery 2000 is, for example, a stacked battery that includes a plurality of batteries 1000 according to Embodiment 1 and has a stacked structure in which the plurality of batteries 1000 are stacked. Battery 2000 may include a plurality of batteries 1100 or 1200 instead of batteries 1000. It should be noted that in FIG. 10, the illustration of the structure in which batteries 1000 are stacked is omitted, and battery 2000 is shown as one rectangle. Since battery 2000 is a stacked battery, high voltage or high capacity can be achieved. Battery 2000 is disposed in interior space 605 of container 600. The battery included in battery system 3000 may be battery 1000, battery 1100 or battery 1200, which is a single cell battery.

Container 600 is a closed container for housing battery 2000. Container 600 includes internal space 605 that serves as a reduced-pressure environment. A reduced-pressure environment is an environment in which the pressure of the environment in which battery 2000 is placed is 1 atm or less. That is, the pressure in internal space 605 is lower than 1 atm. For container 600, for example, internal space 605 may be a reduced-pressure environment by housing battery 2000 in container 600 under a reduced-pressure environment, and internal space 605 may serve as a reduced-pressure environment by means of a vacuum pump (not shown) or a ventilation door, vent, or the like (not shown) that connects to the outside of container 600 in a reduced-pressure environment. Container 600 is, for example, a battery case for protecting power generation element 100 and the like, but it is not limited to a battery-dedicated container such as a battery case, and may be an airplane, a spacecraft, a vacuum chamber, or the like. Container 600 may be flown by, for example, a flight device (not shown).

Figure 11:
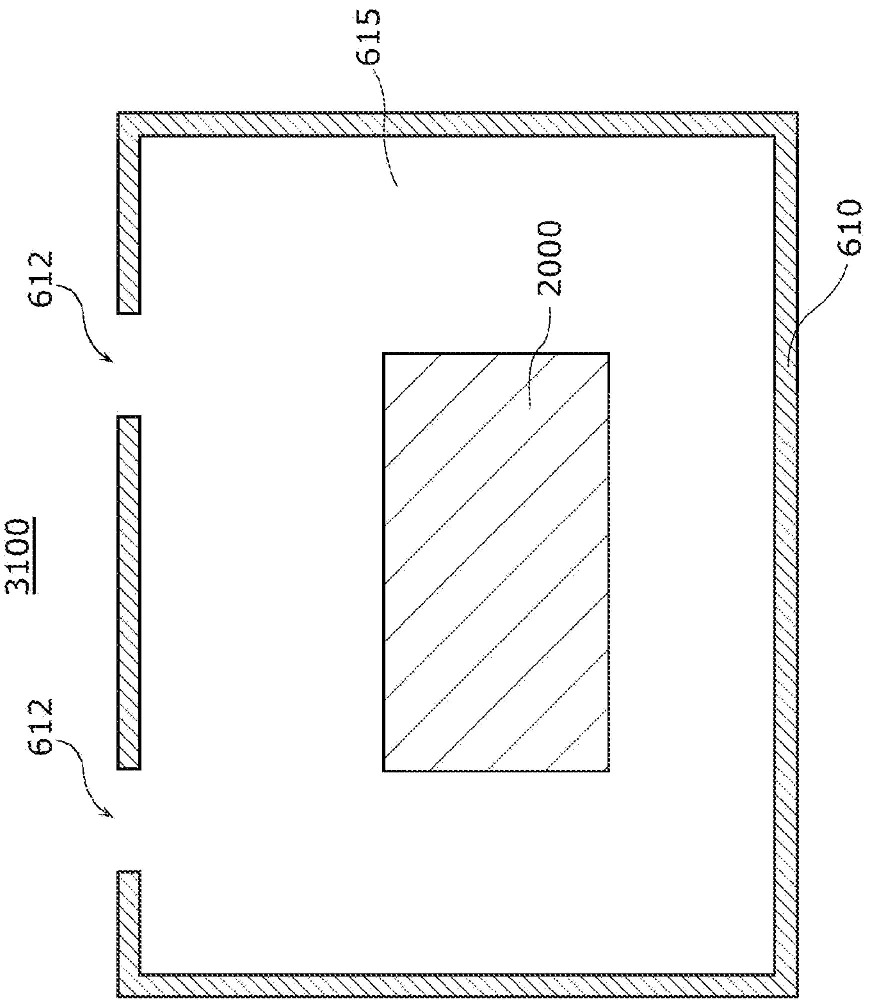
FIG. 11 is a schematic diagram showing a schematic configuration of another battery system according to Embodiment 2.

In addition, FIG. 11 is a schematic diagram showing a schematic configuration of another battery system 3100 according to Embodiment 2. As shown in FIG. 11, battery system 3100 includes battery 2000 and container 610.

Container 610 includes internal space 615 that serves as a reduced-pressure environment. In addition, container 610 is provided with holes 612 that connects internal space 615 and the outside of container 610. Container 610 is, for example, disposed in or moved into a reduced-pressure environment so that internal space 615 serves as a reduced-pressure environment due to holes 612. Container 610 is, for example, a battery case for protecting power generation element 100 and the like, which is installed in a moving object moving in a high-altitude environment or outer space, such as an airplane or spacecraft. Container 610 is not limited to a battery-dedicated container such as a battery case, but may be a housing in equipment used in a high-altitude environment or outer space, or a device housing installed in an airplane or spacecraft.

In this way, in battery system 3000 and battery system 3100, for example, battery 2000 is disposed in a reduced-pressure environment, and battery 2000 is charged or discharged.

In the present embodiment, the pressure of the reduced-pressure environment may be lower than or equal to 0.95 atm, or may be lower than or equal to 0.8 atm. In addition, the pressure of the reduced-pressure environment is, for example, greater than 0 atm. For example, under high-altitude flight conditions, the outside of container 610 is generally in a reduced-pressure environment, and battery system 3100 may be placed in an environment with a pressure, for example, lower than or equal to 0.95 atm, or even lower than or equal to 0.8 atm. Even in such a reduced-pressure environment, battery 2000 has, for example, void 230 with a negative pressure, so that it is less likely to generate a delamination force on the power generation element due to the attempt of the void to expand.

In addition, the internal pressure of void 230 in battery 2000 is, for example, lower than or equal to the pressure in the reduced-pressure environment. Accordingly, a delamination force due to the expansion of void 230 is less likely to occur. In addition, void 230 causes a force to act on power generation element 100 in a direction that restrains each layer of power generation element 100.

In this way, the battery system according to the present embodiment includes battery 1000 and the like according to Embodiment 1, so that high reliability of the battery can be ensured even in a battery system in which the battery is placed in a reduced-pressure environment.

Other Embodiments

Although the battery and battery system according to the present disclosure have been described above based on the embodiments, the present disclosure is not limited to these embodiments. Forms obtained by applying various modifications to the embodiment conceived by a person skilled in the art or other forms realized by combining part of the components in the embodiments without departing from the spirit of the present disclosure are also included in the present disclosure.

For example, in the above embodiments, the method for manufacturing a battery includes a stacking step, but the present invention is not limited thereto. The method for manufacturing a battery may not include a stacking step, and for example, a preformed stacked body may be prepared, and the pressure-reduction step and the sealing step may be performed using the prepared stacked body.

In addition, the above embodiments can be modified, replaced, added, omitted, etc. in various ways within the scope of claims or equivalents thereof.

INDUSTRIAL APPLICABILITY

A battery according to the present disclosure can be used as a battery or the like for electronic equipment, electric appliances, electric vehicles, and the like.

The invention claimed is:

1. A battery comprising:

a power generation element including an electrode layer, a counter electrode layer, and a solid electrolyte layer positioned between the electrode layer and the counter electrode layer;

a sealing material that seals a first surface which is a side surface of the power generation element;

a counter electrode current collector positioned on a side of the counter electrode layer in the power generation element, wherein the void is surrounded by the sealing material, the first surface, the electrode current collector, the counter electrode current collector, and the counter electrode current collector includes a second recess curved to be recessed toward the void and an electrode current collector positioned on a side of the electrode layer in the power generation element;

wherein a void surrounded by the sealing material, the first surface, and the electrode current collector is present, an internal pressure of the void is lower than 1 atm, and the electrode current collector includes a first recess curved to be recessed toward the void.

2. The battery according to claim 1, wherein the internal pressure of the void is lower than or equal to 0.9 atm.

3. The battery according to claim 1, wherein the sealing material is in contact with a side surface of the electrode current collector, and when viewed from a normal direction of a main surface of the power generation element, a position of the side surface of the electrode current collector in contact with the sealing material and a position of the first surface overlap.

4. The battery according to claim 1, wherein the first surface includes a side surface of the electrode layer, a side surface of the counter electrode layer, and a side surface of the solid electrolyte layer, when viewed from a normal direction of a main surface of the power generation element, a position of the side surface of the electrode layer, a position of the side surface of the counter electrode layer, and a position of the side surface of the solid electrolyte layer, which are included in the first surface, overlap.

5. A battery system comprising:

a container including an internal space that serves as a reduced-pressure environment; and the battery according to claim 1 disposed in the internal space.

6. The battery system according to claim 5, wherein a pressure of the reduced-pressure environment is lower than or equal to 0.95 atm.

7. The battery system according to claim 5, wherein the internal pressure of the void is lower than or equal to a pressure of the reduced-pressure environment.

8. A method for manufacturing a battery including a power generation element of claim 1 including an electrode layer, a counter electrode layer, and a solid electrolyte layer positioned between the electrode layer and the counter electrode layer, the method comprising: exposing a first surface to a reduced-pressure atmosphere, the first surface being a side surface of the power generation element in a stacked body including the power generation element, and sealing the first surface with a sealing material under the reduced-pressure atmosphere.

9. The method for manufacturing the battery according to claim 8, the method further comprising:

forming the stacked body including the power generation element in which the electrode layer and the counter electrode layer are stacked to face each other with the solid electrolyte layer interposed therebetween.

10. The method for manufacturing the battery according to claim 8, wherein a pressure of the reduced-pressure atmosphere is lower than or equal to 0.9 atm.

11. The method for manufacturing the battery according to claim 10, wherein the pressure of the reduced-pressure atmosphere is lower than or equal to 0.1 atm.

12. The method for manufacturing the battery according to claim 8, wherein in the sealing, the first surface is sealed by immersing a portion of the stacked body in the sealing material.

13. The method for manufacturing the battery according to claim 8, wherein in the sealing, the first surface is sealed by applying the sealing material to the first surface.

* * * * *